United States Patent [19]

Takagi et al.

[11] Patent Number: 5,003,338
[45] Date of Patent: Mar. 26, 1991

[54] EXPOSURE CONTROL DEVICE FOR CAMERA

[75] Inventors: Tadao Takagi, Yokohama; Toshihiro Sato, Tokyo, both of Japan

[73] Assignee: Nikon Corporation, Tokyo, Japan

[21] Appl. No.: 473,745

[22] Filed: Feb. 2, 1990

[30] Foreign Application Priority Data

Feb. 8, 1989 [JP] Japan ................................. 1-28959
Jun. 28, 1989 [JP] Japan ................................. 1-166305

[51] Int. Cl.$^5$ ............................................. G03B 13/36
[52] U.S. Cl. ................................... 354/402; 354/400; 354/408
[58] Field of Search .................... 354/400, 402, 408

[56] References Cited

U.S. PATENT DOCUMENTS 4,609,274 9/1986 Iwashita et al. ................. 354/400
4,779,119 10/1988 Fujino et al. .................... 354/400

Primary Examiner—Russell E. Adams
Attorney, Agent, or Firm—Shapiro and Shapiro

[57] ABSTRACT

A camera which automatically controls an exposure by identifying a change in composition in image field and the kind of main object. The camera comprises an exposure device for exposing an image-taking plane to an image of the object field formed by an image-taking lens;

a focus detection device for generating a focus detection signal corresponding to the amount of defocus of the image, formed by the image-taking lens, of the object field with respect to a predetermined plane;

an in-focus state detection device for detecting that the image of the object field is focused to the predetermined plane, based on the focus detection signal;

a device for releasing a detection start signal for causing the in-focus state detection device to start an in-focus state detecting operation prior to the operation of the exposure device;

a device for releasing an exposure start signal for starting the operation of the exposure device;

a discrimination device for discriminating, after the in-focus state detection device detects that the image of the object field was once focused to the predetermined plane, whether the object of the object field is still focused to the predetermined plane in response to the exposure start signal, the discrimination device being adapted to execute the discrimination based on the focus detection signal prior to the start of operation of the exposure device; and a control device for controlling the exposure device based on the result of discrimination by the discrimination device.

19 Claims, 10 Drawing Sheets

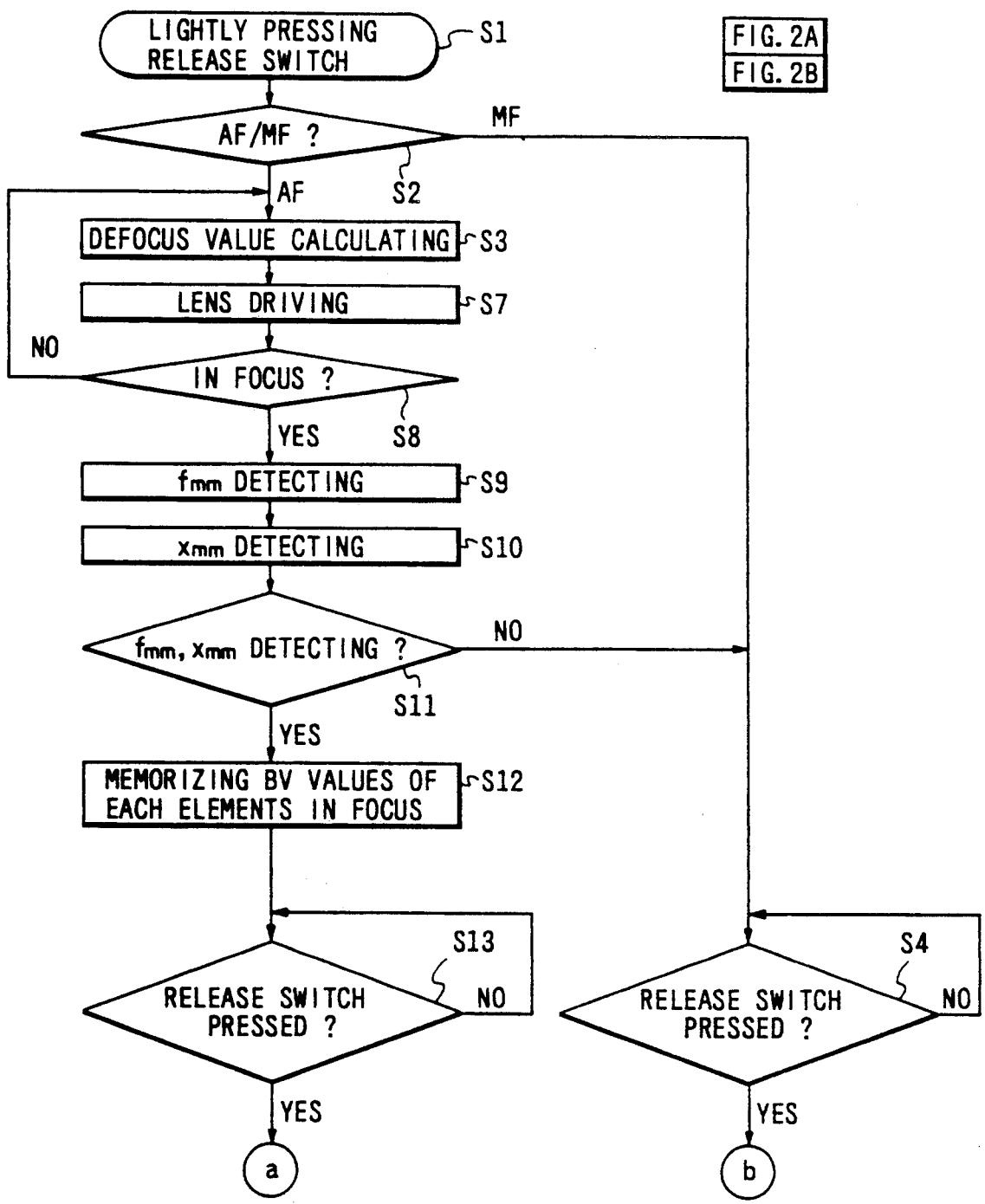

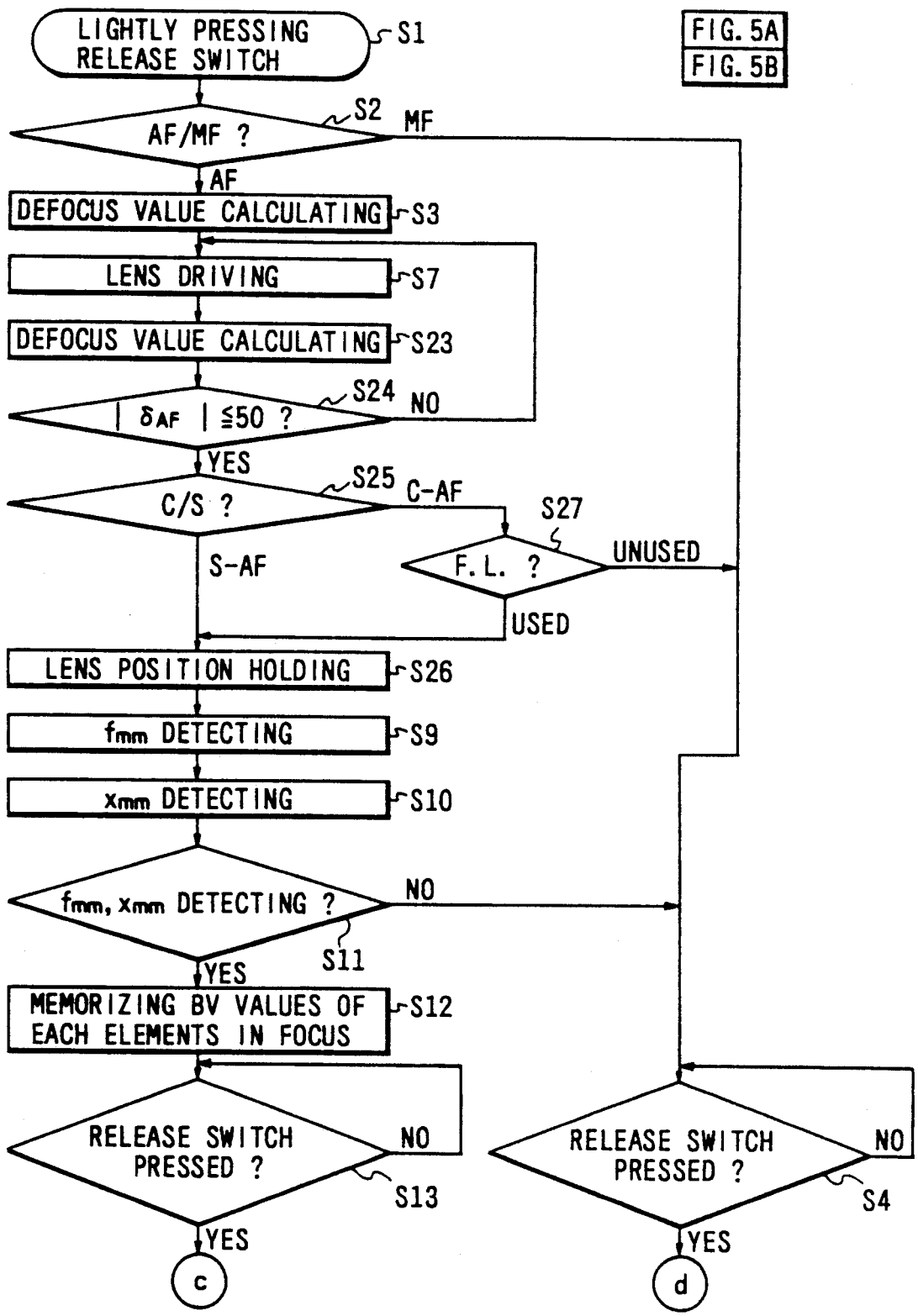

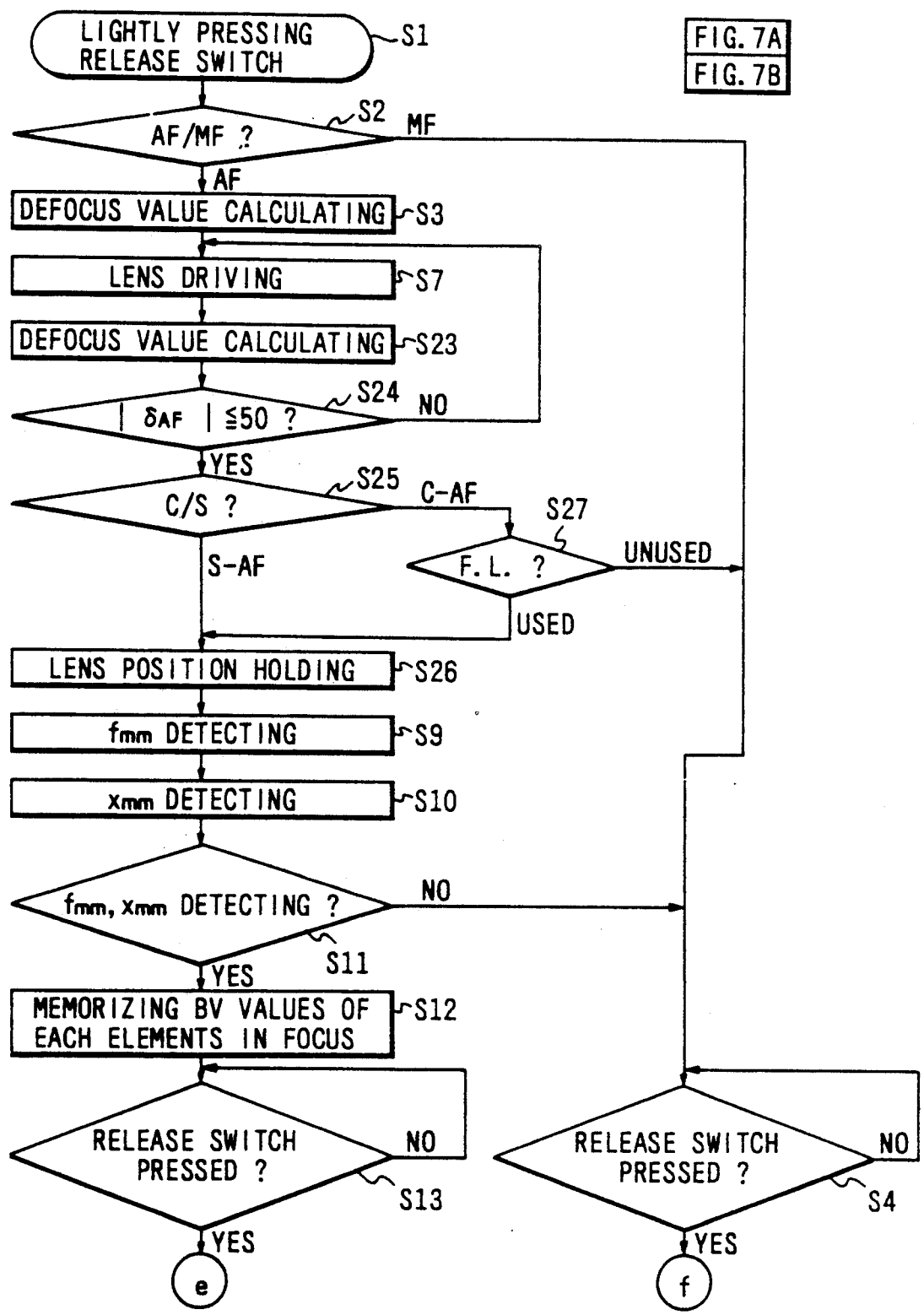

EXPOSURE CONTROL DEVICE FOR CAMERA

BACKGROUND OF THE INVENTION

1. Field of the Invention

The present invention relates to an exposure control device for use in a camera, capable of automatic exposure control by identifying a change in composition in image field and the kind of main object.

2. Related Background Art

In conventional camera with automatic focusing function, there is already known a single (one-shot) auto focusing mode in which the focused state is maintained once the lens is focused to an object in a distance measuring zone, or a focus lock mode by a sliding motion of the camera after it is focused. The exposure in the photographing operation in such single auto focusing mode or focus lock mode has been based on the brightness of the central area of the image field at the focusing operation.

However such conventional camera are often unable to provide appropriate exposure, since the exposure is calculated always in the same manner regardless whether the composition in image field is changed or not and regardless of the nature of the object, whether it is a person, a landscape or a close-up.

SUMMARY OF THE INVENTION

In consideration of the foregoing, an object of the present invention is to provide an exposure control device for use in a camera, capable of finer exposure calculation by identifying the change in composition in image field and the kind of main object.

Another object of the present invention is to provide an exposure control device for use in a camera, capable of providing an appropriate exposure without erroneous identification of a change in composition even in case of an out-of-focus state caused by vibration of camera or main object at the photographing operation.

The above-mentioned objects can be attained, according to the present invention, by an exposure control device of the following structure.

The present invention is applicable to a camera provided with a one-shot auto focusing mode in which the focused state is maintained until the start of exposure operation once said focused state is reached, or a focus lock function in which the focused state can be maintained by a manual operation after said focused is reached.

The present invention provides such camera, provided with light metering device for measuring the brightness of the object according to a light metering pattern predetermined in the object field; focus detecting means for detecting the focus state in a distance measuring zone predetermined in the object field; memory means for storing the output of said light metering means at the focused state; magnification detecting means for detecting the photographing magnification in the focused state; and exposure operating means for calculating the exposure based on the light metering value stored in said memory means after a focused state is reached and if said distance measuring zone is in an out-of-focus state immediately before the exposure operation and if the photographing magnification is within a predetermined range.

Said exposure operating means calculates the exposure based on the light metering value stored in said memory means, when the photographing magnification is within a range not less than 1/110 and not exceeding 1/14.

Also said light metering means includes so-called divided (multi) light metering method in which the light metering is conducted in each of plural light metering areas provided in the object field, and said focus detecting means includes a multi-point distance measuring method in which the focus state detection is conducted in each of plural zones defined in the distance measuring zone.

The camera of the present invention of the above-explained structure is capable of:

(1) discriminating whether the composition in the object field is changed after the focused state is reached, based on the focus state in the distance measuring zone immediately before the exposure operation; and (2) discriminating the kind of the main object, by making distinction at least between a landscape and a person, and preferably a close-up, from the photographing magnification at the focused state, and determining the time of light metering to be adopted (at the focused state or immediately before the exposure), the light metering area and the light metering method based on the combination of the above-mentioned data (1) and (2), thereby obtaining the optimum exposure.

More specifically, the exposure calculation is conducted in following three manners:

[I] In case the composition in the object field is identified to have been changed after the focused state, and the main object is classified as a person, the exposure is determined by the output of a light metering area corresponding to a distance measuring zone at the focused state;

[II] In case the composition in the object field is identified to have been changed after the focused state, and the main object is classified as a landscape, the exposure is determined by the outputs of light metering areas of the entire object field immediately before the exposure; or

[III] In case the composition in the object field is identified as not changed after the focused state, and the main object is classified as a person, the exposure is determined by the output of a light metering area corresponding to the distance measuring zone immediately before the exposure or of the light metering areas in the vicinity.

As the time of light metering output to be adopted, the light metering area and the light metering method are thus selected automatically by the camera in an optimum combination, the probability of obtaining an appropriate exposure can be significantly improved.

Also for the purpose of obtaining an appropriate exposure, without erroneous identification of a change in the composition in the object field, in case of an out-of-focus state caused by vibration of the camera or the main object, the exposure control device of the present invention is provided with light metering means for measuring the brightness of the object field; focus detecting means for detecting the amount of defocus in a predetermined distance measuring zone; in-focus identifying means for releasing an in-focus signal when the defocus amount obtained from said focus detecting means falls within a first designated range; memory means for storing the output of said light metering means when said in-focus signal is released; holding means for holding a photographing lens in an in-focus state either automatically at the release of said in-focus signal or in response to a manual operation after the release of said in-focus signal; and exposure control means for controlling the exposure either based on the light metering value stored in said memory means in case said defocus amount immediately before the exposure is outside a second designated range wider than said first range, or based on the light metering value immediately before the exposure in case said defocus amount falls within said second designated range.

An improved effect can be obtained by setting said second range asymmetrically in the forward focus side and in the backward focus side, around the zero defocus position.

The exposure control device of the above-explained structure is capable of securely preventing the drawback of misunderstanding the vibration of the camera or of the main object as a change in the composition, as the range of defocus for discriminating the change in composition is selected wider than that permitted in the focus detection.

Still other objects of the present invention, and the features and advantages thereof, will become fully apparent from the following description of the preferred embodiments, which is to be taken in conjunction with the attached drawings.

DESCRIPTION OF THE PREFERRED EMBODIMENTS

Figure 1:
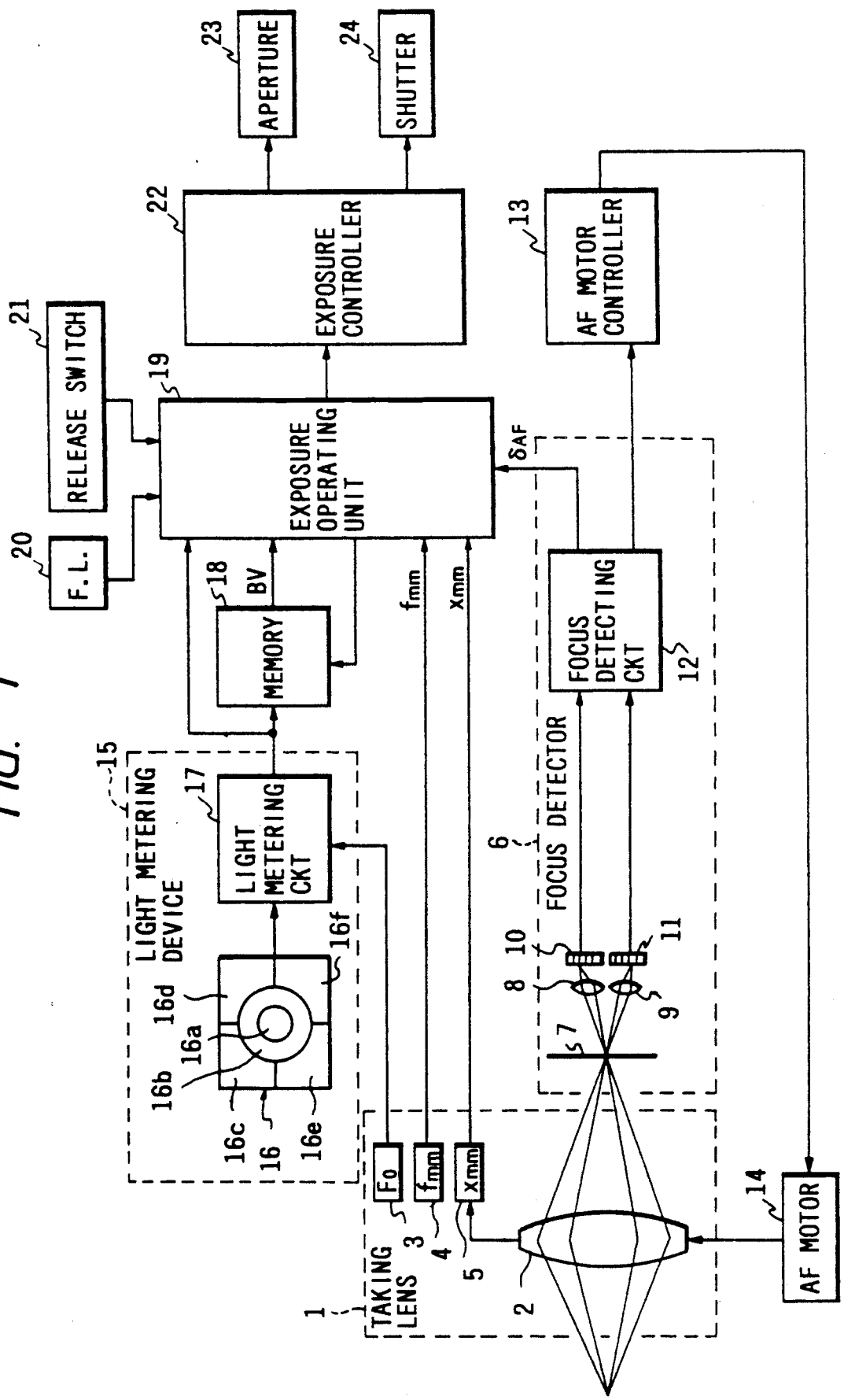
FIG. 1 is a block diagram of an embodiment of the present invention.

FIG. 1 is a block diagram of an embodiment of the present invention.

A taking lens 1 in the present embodiment is provided with a lens 2 which is controlled for focusing by an auto focusing (AF) motor 14. Behind the taking lens 1 there is provided a focus detector 6, including re-imaging lenses 8, 9 and photoelectric converting devices 10, 11, positioned behind a focal plane of the lens 2. The outputs of said photoelectric converting devices 10, 11 are supplied to a focus detecting circuit 12, which identifies the in-focus or out-of-focus state, the forward or backward focus in case of said out-of-focus state, and the defocus amount $\delta_{AF}$ of said forward or backward focus, by comparing the image positions of the photoelectric converting devices 10, 11.

The output of the focus detecting circuit 12 in the focus detector 6 is supplied to an exposure operating unit 19 and an AF motor controller 13, which moves, in an out-of-focus state, the lens 2 to the in-focus state by the AF motor 14.

A light metering device 15 is provided with a photoelectric converting device 16 for light metering and a light metering circuit 17. Said device measures the light of the object field in divided manner in six zones, namely a central area 16a, an annular area 16b around the center, and peripheral areas 16c–16f. The distance measuring zone of the focus detector 6 corresponds, in position, to the central area 16a of the photoelectric converting device 16.

The outputs of light metering from the photoelectric converting device 16 divided into six areas are supplied to the light metering circuit 17, which converts each output into a brightness value BV, utilizing a full-open F-value signal detected in the taking lens 1.

The output of said light metering circuit 17 of the light metering device 15 is supplied to a memory unit 18 and an exposure operating unit 19. Said memory unit 18 stores the output of the light metering device 15 or releases the stored value, according to a command from the exposure operating unit 19.

The exposure operating unit 19 receives brightness values from the light metering circuit 17; brightness values stored in the memory unit 18; focal length f mm and photographic distance x mm of the lens 2 provided in the taking lens 1; defocus amount $\delta AF$ from the focus detecting circuit 12; an unused/used signal from a focus lock operation unit 20; an unpressed/half-pressed/full-pressed signal from a shutter release switch 21; and a film speed (ISO) signal indicating the sensitivity of an unrepresented film, and calculates the optimum exposure based on these input data. The method of optimum exposure calculation by the exposure operating unit 19 will be explained later, with reference to FIG. 2.

In response to an output from the exposure operating unit 19, an exposure control unit 22 controls the aperture of a diaphragm 23 and a shutter 24.

Figure 2B:
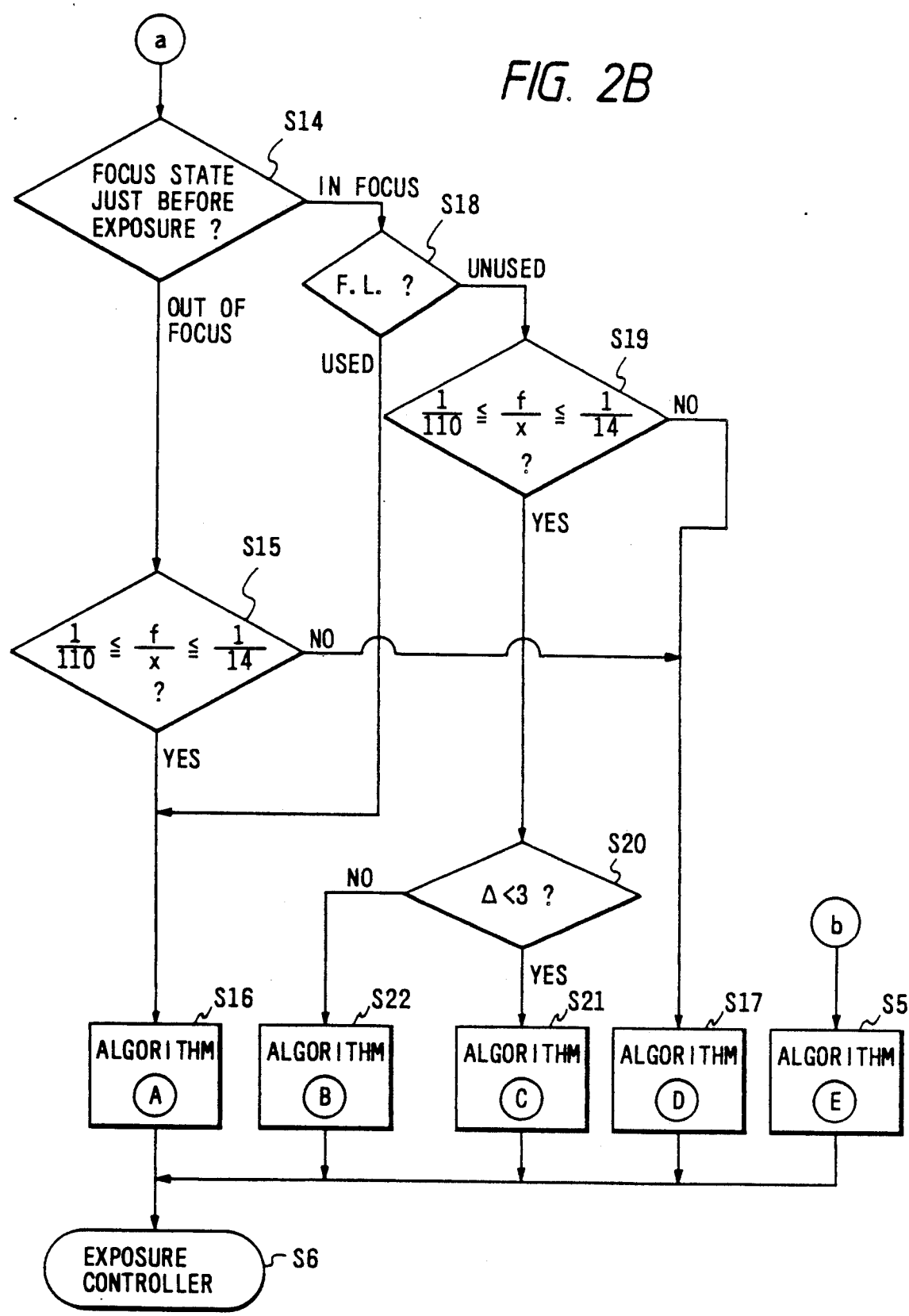
FIG. 2 is a flow chart of a first algorithm for exposure calculation of the present invention.

Now reference is made to a flow chart shown in FIG. 2, for explaining a first algorithm for exposure calculation by the exposure operating unit 19. The camera subjected to the control shown in FIG. 2 is assumed to be capable of selecting a one-shot auto focusing mode or a continuous auto focusing mode and of focus locking.

Now referring to FIG. 2, when the shutter release switch 21 is half depressed in a step S1, the camera is powered and the system is activated. Then a step S2 discriminates whether the lens drive is in the auto focusing (AF) mode or in the manual focusing (MF) mode. The AF mode means that the taking lens is capable of auto focusing and that the AF operation (one-shot auto focusing or continuous auto focusing) is selected if auto focusing or manual focusing is selectable. Any other case is regarded as an MF mode.

The sequence proceeds to a step S3 or S4 respectively when the step S2 identifies an AF mode or an MF mode. The step S4 awaits the full push of the release switch 21, then a step S5 selects an algorithm E for calculating the exposure value as will be explained later, and a step S6 executes exposure control according to the exposure value calculated in said algorithm E.

On the other hand, if the step S2 identifies an AF mode, a step S3 calculates the defocus amount and a step S7 drives the lens according to thus calculated defocus amount. Then a step S8 detects the focus state, and, if out of focus, the sequence returns to the step S3 for effecting the focusing again. If the step S8 identifies an in-focus state, a step S9 detects the focal length f mm, and a step S10 detects the photographing distance x mm in the in-focus state. If the taking lens 1 is incapable of detecting the focal length (f mm) or the photographing distance (x mm), the sequence proceeds without the detections in the steps S9 and S10, and a next step S11 discriminates that the taking lens is incapable of such detections. Then the sequence proceeds to the step S4, and, as in the case of MF mode, proceeds to the step S6 through the step S5 for the algorithm E.

On the other hand, if the steps S9, S10 detect the focal length (f mm) and the photographing distance (x mm) in the in-focus state, the sequence proceeds from the step S11 to a step S12 for storing the outputs of light metering, namely the brightness values, in the in-focus state. In the embodiment shown in FIG. 1, employing the photoelectric converting device 16 divided into six areas 16a–16f, there are stored six brightness values BVa–BVf.

Then a step S13 awaits the full push of the release switch 21, and, when said switch is fully depressed, a step S14 discriminates the focus state immediately before the exposure, or, in the present embodiment, immediately after the full-push of the release switch 21. If the step S14 identifies an out-of-focus state immediately before the exposure, the sequence proceeds to a step S15. Such out-of-focus state immediately before the exposure is encountered, for example, when the camera is set at the one-shot auto focusing mode and the composition in the object field is altered after focusing to the main object.

The step S15 calculates the photographing magnification f/x by dividing the focal length f mm with the photographing distance x mm at the in-focus state. If said photographing magnification f/x is with a range:

$$1/110 \leqq f/x \leqq 1/14$$

the main object is identified as a person, and the sequence proceeds to a step S16 for calculating the exposure value for a person according to an algorithm A to be explained later.

The above-mentioned range in the step S15 corresponds, for example for a focal length f=50 mm, to a photographing distance x=70 cm–5.5 m, which can be generally attributable to the photographing of a person or persons.

On the other hand, if the step S15 identifies that the photographing magnification is outside of said range, the main object can be generally identified as a landscape, and the sequence proceeds to a step S17 for selecting the exposure calculation by the algorithm D to be explained later.

If the step S14 identifies the in-focus state immediately before the exposure, the sequence proceeds to a step S18 for identifying whether the focus locking is used. If the focus locking is used, the sequence proceeds to the step S16 regardless whether the auto focusing is in the one-shot AF mode or continuous AF mode, and the exposure value is calculated according to the algorithm A in the same manner as in the case where the main object is identified as a person.

If the step S18 identifies that the focus locking not used, the sequence proceeds to a step S19 for discriminating, as in the step S15, whether the magnification satisfies a relation:

$$1/110 \leqq f/x \leqq 1/14.$$

If not, indicating that the main object is generally a landscape, the sequence proceeds to the step S17 for calculating the exposure value according to the algorithm D to be explained later.

On the other hand, if the step S19 identifies that the photographing magnification f/x falls within the above-mentioned range, indicating that the main object is generally a person, there is executed a step S20 for calculating the maximum brightness difference $\Delta$ between the brightness BVa obtained from the output of the central area 16a of the photoelectric converting device 16 and the brightnesses BVb–BVf from the peripheral areas 16b–16f, namely:

$\Delta$=(maximum brightness of peripheral areas)−(brightness of central area).

If $\Delta<3$, the sequence proceeds to a step S21 for calculating the exposure value according to an algorithm C to be explained later. If $\Delta \geqq 3$, the sequence proceeds to a step S22 for calculating the exposure value according to an algorithm B to be explained later.

The algorithms A–E shown in FIG. 2 will be explained in the following:

Algorithm A: It calculates the exposure value based on the brightness BVa of the central area 16a in the in-focus state or in the focus-locked state.

Algorithm B: It calculates the exposure value based on the brightness BVb of the central area 16a immediately before the exposure.

Algorithm C: It calculates the exposure value based on the average (BVa'+BVb')/2 of the brightnesses BVa', BVb' of the central area 16a and the surrounding circular area 16b, immediately before the exposure.

Algorithm D: It calculates the exposure value according to a method determined from the maximum brightness BVmax among those BVa–BVf of six divided areas, the maximum brightness difference $\Delta$BV and the photographing magnification f/x immediately before the exposure. The determination of calculating method will be explained later, with reference to FIG. 3.

Algorithm E: It calculates the exposure value according to a method determined from the maximum brightness BVmax among those BVa–BVf of six divided areas, and the maximum brightness difference $\Delta$BV immediately before the exposure. The determination of calculating method will be explained later, with reference to FIG. 4.

Figure 3:
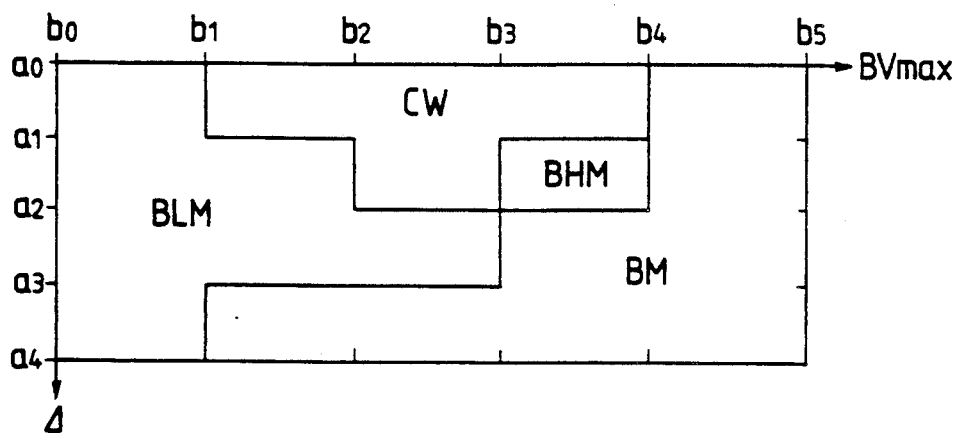
FIG. 3 is a schematic view showing the content of an algorithm D shown in FIG. 2.

FIG. 3 schematically shows a selection table to be employed in the exposure calculation of the algorithm D shown in FIG. 2, and, in the present embodiment, there are employed four exposure calculations CW, BM, BLM and BHM.

The table in FIG. 3 shows the maximum brightness BVmax, among the brightnesses BVa–BVf of the object obtained from six photoelectric converting devices 16a–16f, in the abscissa, and the maximum brightness difference $\Delta$ between said maximum brightness BVmax and the minimum brightness BVmin in the ordinate, and one of the above-mentioned four calculating methods is selected according to the values of BVmax and $\Delta$. The symbols b1–b4 indicate preselected constants relating to the maximum brightness, and a1–a4 are preselected constants relating to the maximum brightness difference.

The above-mentioned methods of exposure calculation are represented as follows:

$$CW = BVa \quad (1)$$

$$BM = (BVa + \ldots + BVf)/6 \quad (2)$$

$$BLM = (BM + BVmin)/2 \quad (3)$$

$$BHM = (BM + BVmax)/2 \quad (4)$$

Thus the calculation CW gives emphasis on the central area of the object field. The BM method is based on the average of six areas. The BLM method gives weighting on the low brightness, while the BHM method gives weighting on the high brightness.

As an example, for a case of BVa=12.6, BVb=13.1, BVc=10.5, BVd=12.0, BVe=13.5 and BVf=14.0, there are obtained:

maximum brightness BVmax=BVf=14.0;
maximum brightness difference $\Delta$=3.5.

If b3, b4, a2 and a3 in FIG. 3 are so determined as to satisfy:

$$b3 < 14 < b4, \ a2 < 3.5 < a3$$

the BM method is selected for exposure calculation, and the above-explained equation (2) provides BM=12.6 according to which the exposure value is calculated.

Thus the algorithm D determines the exposure based on the maximum brightness BVmax and the maximum brightness difference $\Delta$, so that the photograph can be obtained with an exposure balanced over the entire field in case the main object is a landscape.

Figure 4:
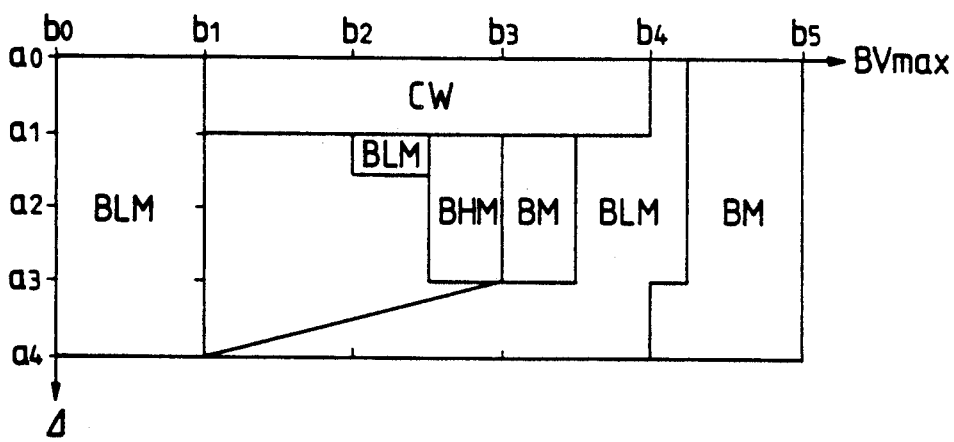
FIG. 4 is a schematic view showing the content of an algorithm E shown in FIG. 2.

FIG. 4 shows the selection table employed in the algorithm E shown in FIG. 2, representing the maximum brightness BVmax in the abscissa and the maximum brightness difference $\Delta$ in the ordinate as in FIG. 3, and said algorithm E employs four calculating methods CW, BM, BLM and BHM.

Also in said algorithm E shown in FIG. 4, if the maximum brightness and the maximum brightness difference satisfy the following relations:

$$b3 < BVmax < b4 \ \text{and} \ a3 < \Delta$$

there is selected the BLM method in which the calculation is made with weighting on the low brightness, according to the aforementioned equation (3).

Figure 5B:
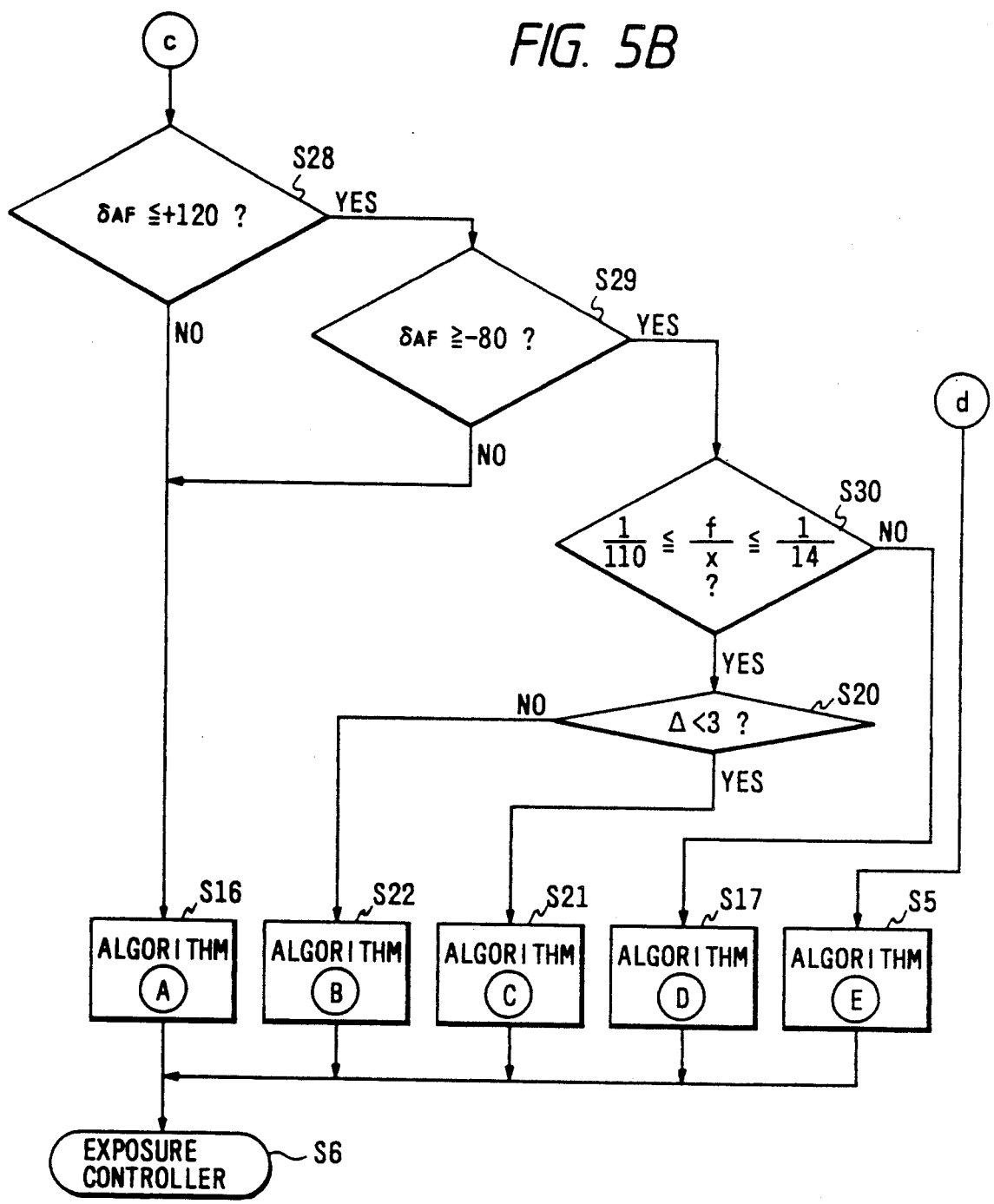
FIG. 5 is a flow chart of a second algorithm for exposure calculation of the present invention.

Now reference is made to FIG. 5 for explaining a second algorithm of exposure calculation by the exposure operating unit 19 shown in FIG. 1. In FIG. 5, same steps as those in the first algorithm shown in FIG. 2 are represented by same numbers and will not be explained further.

In the flow chart shown in FIG. 5, if the step S2 identifies an AF mode, the step S3 detects the defocus amount $\delta_{AF}$ and the step S7 drives the lens according to said defocus amount. Subsequently a step S23 again calculates the defocus amount $\delta_{AF}$, and a step S24 discriminates whether the absolute value $|\delta_{AF}|$ of said defocus amount falls within a first designated range of 50 $\mu$m shown in FIG. 6. In case of:

$$|\delta_{AF}| \leq 50 \ \mu m$$

an in-focus state is identified and the sequence proceeds to a step S25, but, in case of:

$$|\delta_{AF}| > 50 \ \mu m$$

the sequence returns to the step S7 and the above-explained loop is repeated until the condition $|\delta_{AF}| \leq 50 \ \mu m$ is reached.

The step S25 discriminates whether the auto focusing is in the continuous auto focusing (C-AF) mode or in the single or one-shot auto focusing (S-AF) mode, and the sequence proceeds to a step S26 or S27 respectively in case of the single auto focusing mode or the continuous auto focusing mode. The step S27 discriminates whether the focus locking is used, and the sequence proceeds to the step S26 or S4 respectively when the focus locking is used or not.

The step S26 holds the lens position, then the step 9 detects the focal length f mm, and the step S10 detects the photographing distance x mm in the in-focus state. If the taking lens 1 is incapable of detecting the focal length f mm or the photographing distance x mm, the sequence proceeds without the detections in the steps S9 and S10, and the next step S11 discriminates that the taking lens is incapable of such detections. Then the sequence proceeds to the step S4, and, as in the case of MF mode, proceeds to the step S6 through the step S5 for the algorithm E.

On the other hand, if the steps S9, S10 detect the focal length (f mm) and the photographing distance (x mm) in the in-focus state, the sequence proceeds from the step S11 to S12 for storing the outputs of light metering, or the brightness values.

Figure 6:
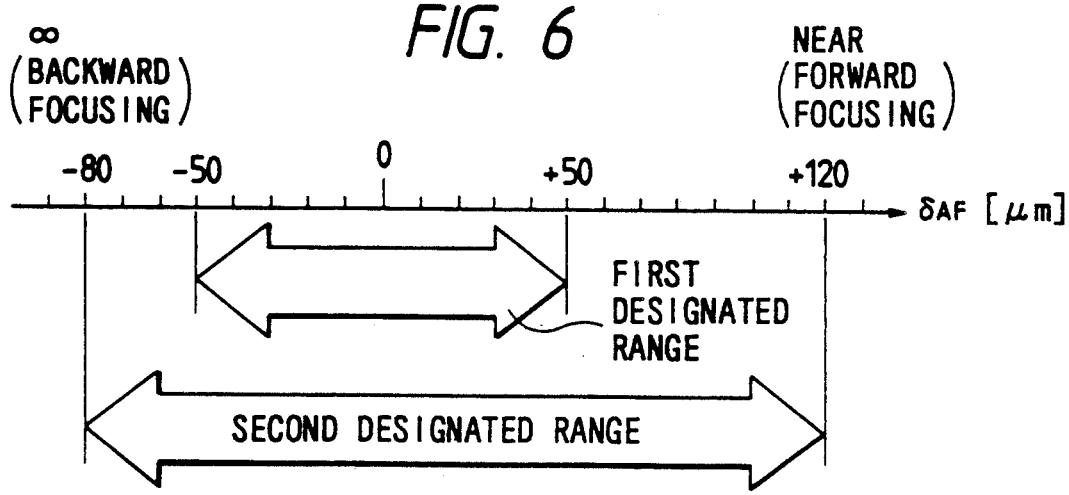
FIG. 6 is a schematic view showing the relationship between the first designated range and the second one.

Then the step S13 awaits the full push of the release switch 21, and, when said switch is fully depressed, a step S28 discriminates whether the defocus amount $\delta_{AF}$ immediately before the exposure, or immediately after the full push of the release switch 21 in the present embodiment, satisfies a condition:

$$\delta_{AF} \leq +120 \ \mu m$$

with respect to the second range designated in the forward focus side as shown in FIG. 6. Then the sequence proceeds to a step S29 or to the step S16, respectively when said condition is satisfied or not.

The step S29 discriminates whether said defocus amount $\delta_{AF}$ satisfies a condition:

$$\delta_{AF} \geq -80$$

with respect to the second range designated in the backward focus side as shown in FIG. 6, and the sequence proceeds to a step S30 or to the step S16 respectively when said condition is satisfied or not. Consequently the step S16 is reached in case of $$\delta_{AF} > +120 \ \mu m \ \text{or}$$

$$\delta_{AF} < -80 \ \mu m,$$

and such major defocus immediately before the exposure occurs for example when the camera set in the one-shot AF mode is focused to the main object and subsequently the composition in the object field is changed.

Said step S16 selects the exposure calculation according to the algorithm A, and the sequence then proceeds to the step S6.

On the other hand, the step S30 is reached in case of:

$$-80\ \mu m \leq \delta_{AF} \leq +120\ \mu m,$$

and said step S30 discriminates whether the photographing magnification f/x falls within a range:

$$1/110 \leq f/x \leq 1/14.$$

If the magnification f/x is outside of said range, indicating generally that the main object is a landscape or a close-up, the sequence proceeds to the step S17 for calculating the exposure according to the algorithm D.

On the other hand, if the step S30 identifies that the magnification f/x falls within said range, indicating generally that the main object is a person, the sequence proceeds to the step S20 for discriminating the magnitude of the maximum brightness difference Δ, and, if said difference is small, meeting a condition Δ<3, the sequence proceeds to the step S21 for calculating the exposure value according to the algorithm C. On the other hand, if said difference is large, meeting a condition Δ≧3, the sequence proceeds to the step S22 for calculating the exposure according to the algorithm B.

In the following there will be explained the difference between the first designated range for discriminating the focus state of the defocus amount $\delta_{AF}$ and the second designated range for discriminating the change in composition, with reference to FIG. 6.

In the discrimination of focus state, an in-focus state is identified if a condition:

$$|\delta_{AF}| \leq 50\ \mu m$$

is satisfied, and this range is called the first designated range. On the other hand, the change in composition is identified absent within a range:

$$-80\ \mu m \leq \delta_{AF} \leq +120\ \mu m$$

and this range is called the second designated range. Said second range is selected wider than the first range, in order to prevent misunderstanding of vibration of camera or main object as "a change in the composition of the object field".

Also the second range is selected wider in the forward focus side and narrower in the backward focus side, because of the depth of object field is wider in the backward focus side though the amplitude vibration of the photographer or the main object is same in probability in both sides.

In the following there will be explained a third algorithm of the exposure calculation by the exposure operating unit shown in FIG. 1, with reference to FIG. 7. Said third algorithm is featured by a fact that the second designated range, already explained in the second algorithm shown in FIG. 5, is made variable according to the photographing distance (x mm).

Figure 8:
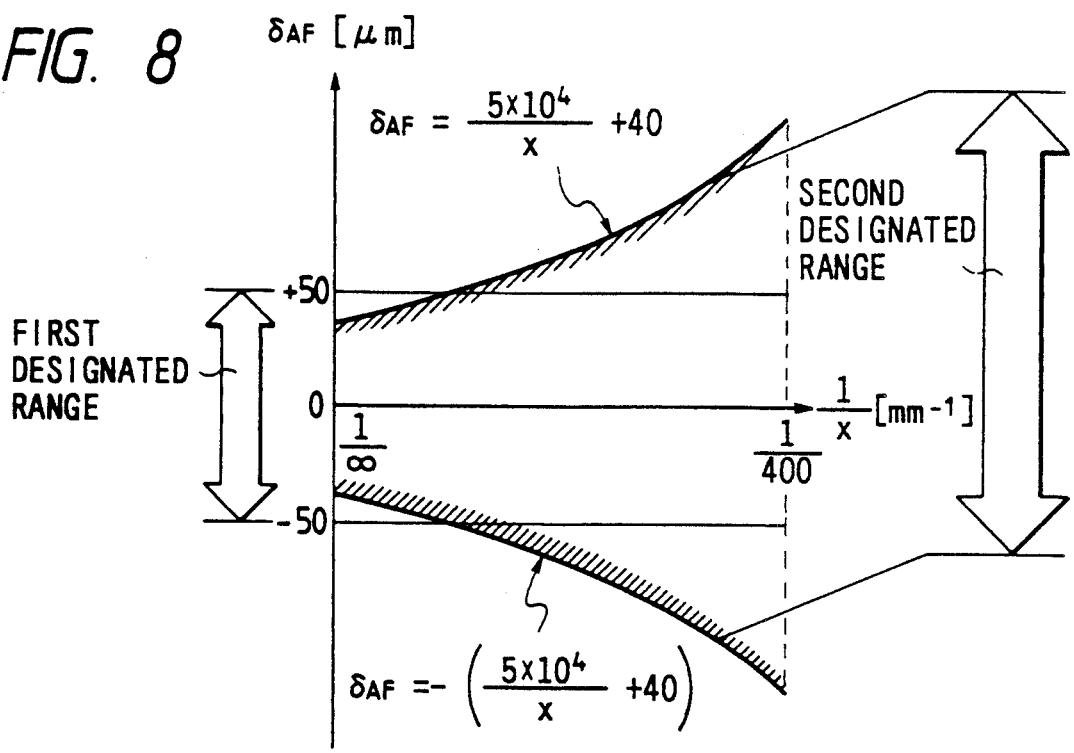
FIG. 8 is a chart showing the relationship among the first and second designated ranges and the photographing distance x.

The relationship between the photographing distance x and the second designated range is defined by the following, as shown in FIG. 8:

$$-\left(\frac{5 \times 10^4}{x} + 40\right) \leq \delta_{AF} \leq +\left(\frac{5 \times 10^4}{x} + 40\right)$$

Figure 7B:
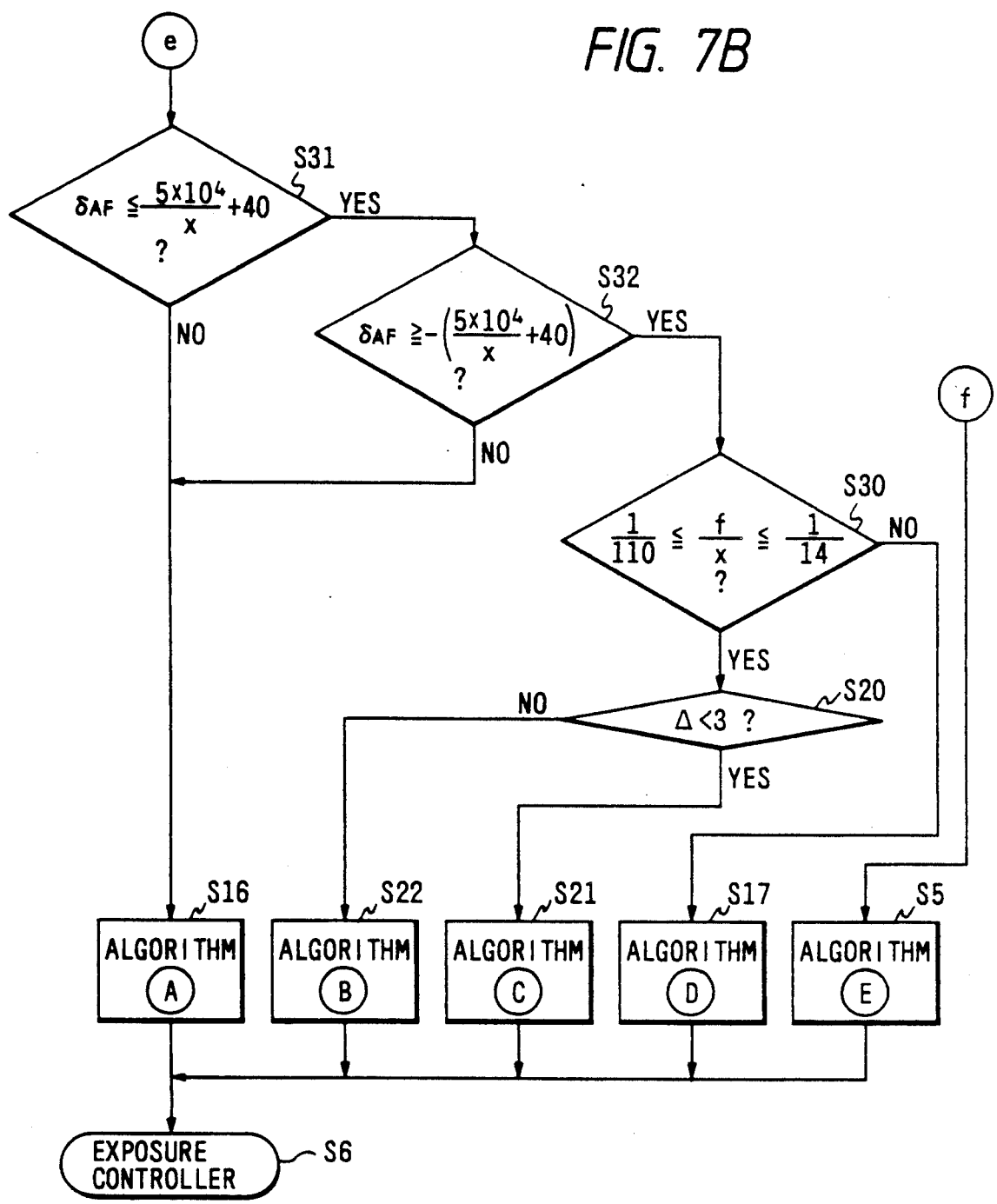
FIG. 7 is a flow chart of a third algorithm for exposure calculation of the present invention.

FIG. 7 shows the corresponding algorithm for exposure calculation, which is same as the algorithm shown in FIG. 5 except for steps S31 and S32, which will be explained in the following.

When the release switch 21 is fully pushed in the step S13, the sequence proceeds to a step S31 for discriminating whether the defocus amount $\delta_{AF}$, immediately before the exposure, or immediately after the full push of the release switch 21 in the present embodiment, satisfies a relation:

$$\delta_{AF} \leq +\left(\frac{5 \times 10^4}{x} + 40\right)\mu m$$

utilizing the second designated range selected in the forward focus side as shown in FIG. 8. Then the sequence proceeds to the step S32 or the step S16 respectively when said relation is satisfied or not.

The step S32 discriminates whether the defocus amount $\delta_{AF}$ satisfies a relation $$\delta_{AF} \geq -\left(\frac{5 \times 10^4}{x} + 40\right)\mu m$$

utilizing the second designated range selected in the backward focus side as shown in FIG. 8. Then the sequence proceeds to the step S30 or the step S16 respectively when said relation is satisfied or not.

Thereafter executed are same steps as those in the second algorithm.

Figure 9:
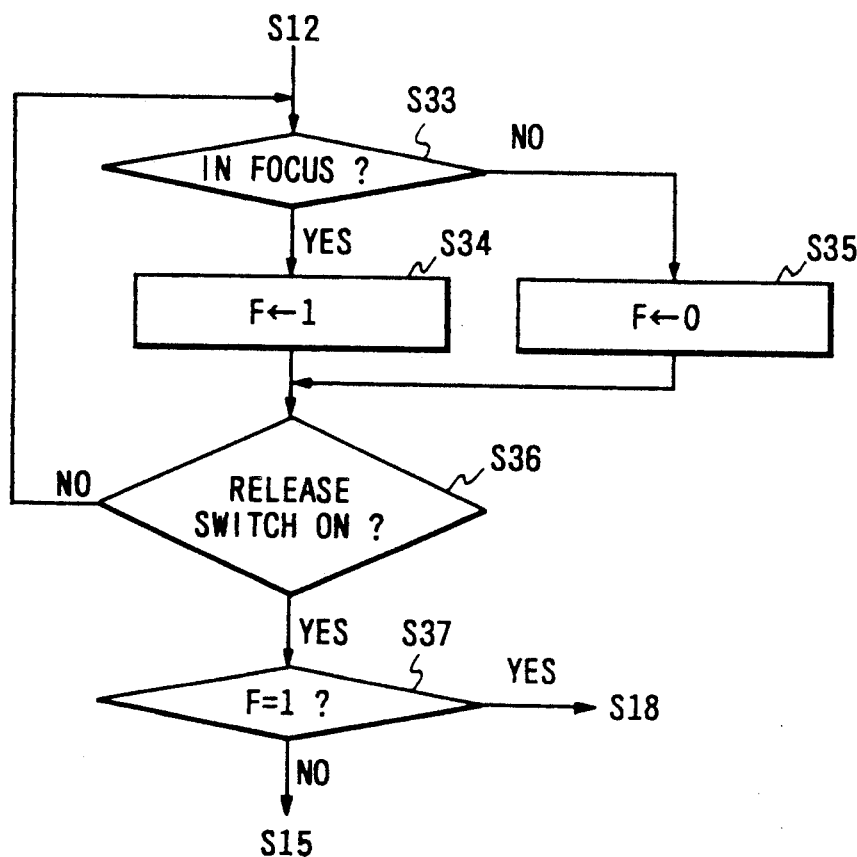
FIG. 9 is a flow chart of an algorithm for obtaining an in-focus state prior to the full pressing of a release switch.

In the following there will be explained an improvement on the first to third embodiments. In said first to third embodiments, the defocus amount is calculated to obtain the in-focus state before the exposure, by receiving the full-push signal of the release switch 21 in the step S13. However the present invention is not limited to such embodiments, but can be so constructed as to always detect the focus state before the full push of the release switch 21. As an example, FIG. 9 shows an improvement on the first algorithm. After the brightness in the in-focus state is stored in the step S12, a step S33 detects the focus state, and, if in focus, a step S34 sets "1" in a flag F. If out of focus, a step S35 sets "0" in the flag F. Then the sequence proceeds to a step S36 for discriminating whether the switch 21 is fully pushed, and, if fully pushed, a step S37 discriminates whether the flag F is "1". If said flag F is "1" indicating the in-focus state, the sequence proceeds to the step S18, but, if said flag F is "0" indicating the out-of-focus state, the sequence proceeds to the step S15. If the release switch 21 is not fully pushed in the step S36, the sequence proceeds to the step S33 for repeating the focus state detection until said full push takes place.

The above-explained algorithm enables focus state detection prior to the full push of the release switch 21.

The above-explained improvement is applicable not only to the first algorithm but also to the second or third one.

Figure 10:
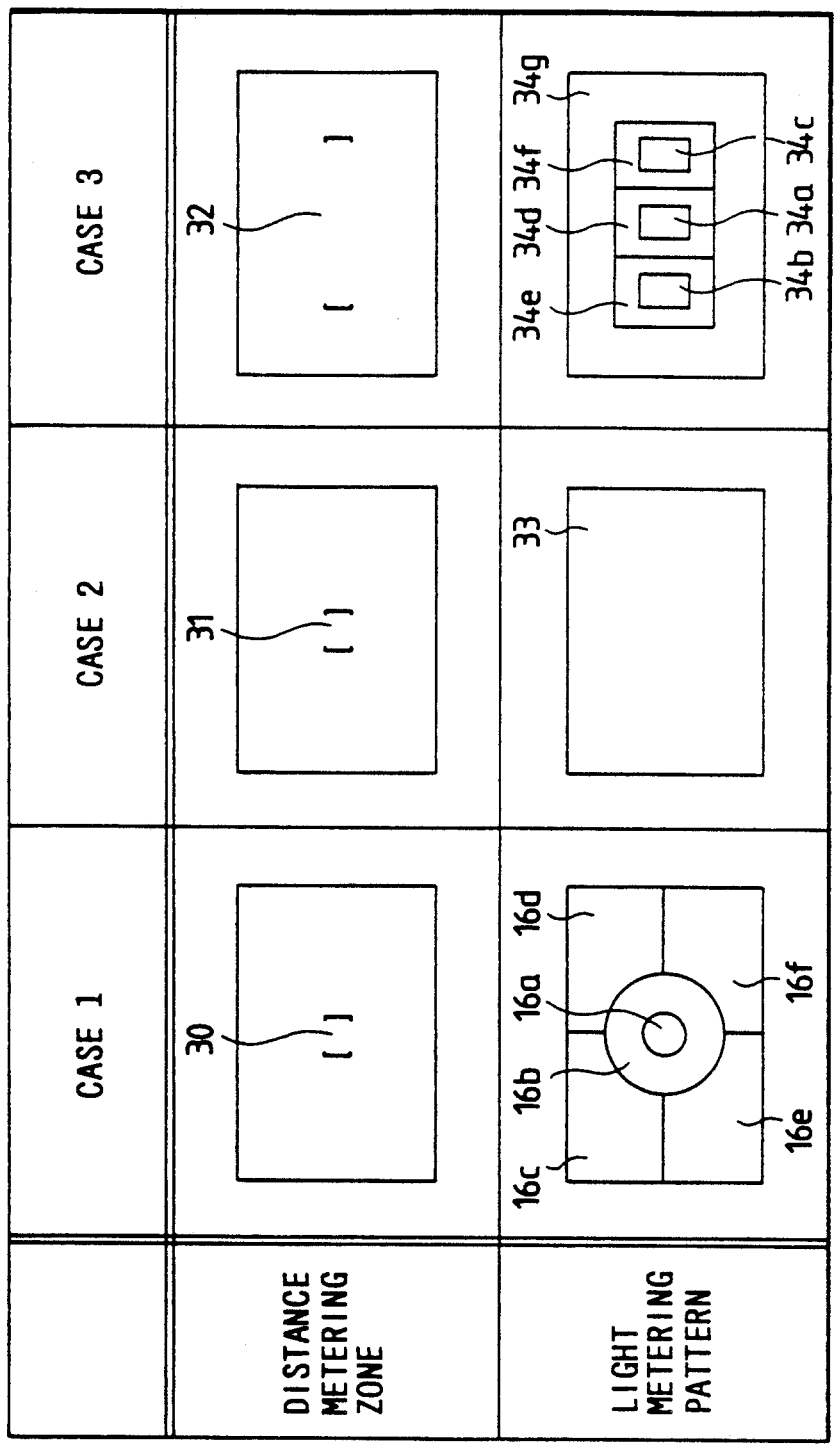
FIG. 10 is a schematic view showing the correspondence between the distance measuring zone and the light metering pattern in another embodiment of the present invention.

FIG. 10 shows three different cases of the combination of the distance measuring zone and the light metering pattern.

In FIG. 10, the case 1 indicates the embodiment shown in FIG. 1, in which the distance measuring zone 30 exactly corresponds to the light metering area 16a.

The case 2 shows a second embodiment of the present invention, in which the distance measuring zone 31 corresponds to a light metering area 33 with central weighting.

The case 3 shows a third embodiment of the present invention, in which the distance measuring zone 32 is laterally oblong, and the in-focus position there is identifiable. In correspondence to such distance measuring zone 32, there are provided light metering areas so as to divide the distance measuring zone into left, center and right zones, and said light metering areas are further divided into central areas 34a, 34b, 34c and surrounding areas 34d, 34e, 34f. Thus, there are provided seven light areas in total, including a peripheral area 34g. In such case 3, the brightness at the in-focus state is stored in one of said left, center and right light metering areas corresponding to the in-focus position in the distance measuring zone 32, and the appropriate exposure value is calculated according to the algorithm shown in FIG. 2, 5 or 7.

In the algorithm shown in FIG. 2, 5 or 7, the calculation of exposure value according to one of the algorithms A-E is conducted only in the auto focusing operation, but, even for a taking lens lacking the auto focusing ability, the exposure calculation according to one of the algorithms A-E may be conducted in the manual focusing mode, in the identical manner as in the auto focusing shown in FIG. 2, 5 or 7, if the detection of focus state and the detection of the focal length (f mm) and the photographing distance (x mm) are possible in a manual operation.

In the algorithm shown in FIG. 5, the focus state detection in the step S25 and the storage of the light metered value in the step S12 can be considered practically simultaneous, since the steps S25-S12 are executed within a very short time (less than 10 ms).

Also the steps S9-S11 are not limitative to the present invention, and may be dispensed with in the algorithm.

Furthermore, the focus detecting device to be employed in the present invention may be of the active type or the passive type.

As detailedly explained in the foregoing, the present invention identifies whether the composition in the object field is changed after focusing, based on the focus state in the distance measuring zone immediately before the exposure, and classifies the main object generally into a landscape, a person, and eventually a close-up, based on the photographing magnification in the in-focus state, and these two data are utilized in combination for determining the timing of data taking of light metering, namely at the in-focus state or immediately before the exposure; the light metering area and the light metering method for exposure calculation. Therefore the exposure calculation can be conducted in more precise manner, and the probability of obtaining the appropriate exposure can be significantly improved.

Also in the present invention, since the range of defocus used in discriminating a change in the composition is selected wider than the defocus tolerated in the focusing, there can be securely prevented a drawback of misunderstanding the vibration of the camera or the main object as a change in the composition of the object field.

Although the exposure control device of the present invention has been explained by embodiments thereof shown in the attached drawings, the present invention is not limited to such embodiments and is naturally subject to modifications and alterations within the scope and spirit of the appended claims.

We claim:

1. A camera comprising:
   exposure means for exposing an image-taking plane to an image of the object field formed by an image-taking lens;
   focus detection means for generating a focus detection signal corresponding to the amount of defocus of said image, formed by the image-taking lens, of the object field with respect to a predetermined plane;
   in-focus state detection means for detecting that the image of the object field is focused to said predetermined plane, based on said focus detection signal;
   means for releasing a detection start signal for causing said in-focus state detection means to start an in-focus state detecting operation prior to the operation of said exposure means;
   means for releasing an exposure start signal for starting the operation of said exposure means;
   discrimination means for discriminating, after said in-focus state detection means detects that the image of the object field was once focused to said predetermined plane, whether the object of the object field is still focused to said predetermined plane in response to said exposure start signal, said discrimination means being adapted to execute said discrimination based on said focus detection signal prior to the start of operation of said exposure means; and
   control means for controlling said exposure means based on the result of discrimination by said discrimination means.

2. A camera according to claim 1, comprising plural exposure control modes, wherein said control means is adapted to select one of said plural exposure control modes in response to the result of discrimination by said discrimination means, prior to the start of operation of said exposure means.

3. A camera according to claim 2, further comprising drive means for driving the image-taking lens according to the result of detection of said in-focus state detection means in response to said detection start signal, wherein said exposure start signal is released after a lens driving operation by said drive means.

4. A camera comprising:
   detection means for detecting a focus state;
   exposure means for exposing an image-taking plane;
   means for releasing an exposure start signal for starting the operation of said exposure means; and
   discrimination means for discriminating, prior to the operation of said exposure means, a change in the image composition between before and after the generation of said exposure start signal, said discrimination means being adapted to execute said discrimination based on the result of detection by said detection means, in response to said exposure start signal.

5. A camera according to claim 4, wherein said discrimination means identifies a change in the image composition, in case said camera reaches the in-focus state prior to the release of said exposure start signal but in an out-of-focus state after the release of said exposure start signal but before the start of operation of said exposure means.

6. A camera according to claim 4, further comprising:
   light metering means for metering the brightness of the object field;
   memory means for storing the output of said light metering at an in-focus state; and exposure operating means for discriminating whether to effect the exposure operation in the state of the image of the object field in said in-focus state or in the state of said image immediately before the exposure operation according to the focus state detected by said in-focus state detection means immediately before the exposure operation by said exposure means;

wherein said in-focus state detection means is adapted to release the in-focus signal when the amount of defocus detected by said focus detection means falls within a first predetermined range; and said exposure operating means is adapted to execute the exposure operation based on the light metered value stored in said memory means when said defocus amount immediately before the exposure operation by said exposure means is outside a second predetermined range wider than said first predetermined range, but execute the exposure operation based on the light metered value immediately before the exposure operation when said defocus amount falls within said second predetermined range.

7. A camera according to claim 6, wherein said second predetermined range is asymmetrically selected in the forward and backward focus sides around the zero defocus position.

8. A camera according to claim 6, wherein said second predetermined range is rendered variable according to the photographing distance to the object.

9. A camera comprising:
exposure means for exposing an image-taking plane to an image of the object field formed by an image-taking lens;
focus detection means for detecting the focus state in a predetermined zone; and
exposure operating means for discriminating whether to effect the exposure operation in the state of the image of the object field after the focusing operation or in the state of said image immediately before the exposure operation according to the focus state detected by said focus detection means immediately before the exposure operation by said exposure means.

10. A camera according to claim 9, further comprising:
light metering means for metering the brightness of the object field; and
memory means for storing the output of said light metering means at an in-focus state;
wherein said exposure operating means is adapted to discriminate whether to execute the exposure operation based on the light metered value stored in said memory means or based on the output of said light metering means immediately before the exposure operation, according to the focus state detected by said focus detection means immediately before the exposure operation by said exposure means.

11. A camera according to claim 10, further comprising:
magnification detection means for detecting the photographing magnification in the in-focus state;
wherein said exposure operating means is adapted to execute the exposure operation based on the light metered value stored in said memory means, when a predetermined zone of said focus detection means is in an out-of-focus state and the magnification detected by said magnification detection means falls within a predetermined range.

12. A camera according to claim 10, wherein said light metering means comprises plural light metering areas and measures the brightness in each of said areas.

13. A camera according to claim 9, wherein said focus detection means comprises plural zones and detects the focus state in each of said zones.

14. A camera comprising:
exposure means for exposing an image-taking plane to an image of the object field formed by an image-taking lens;
focus detection means for generating a focus detection signal corresponding to the amount of defocus of said image, formed by the image-taking lens, of the object field, with respect to a predetermined plane;
in-focus state detection means for detecting that the image of the object field is focused to said predetermined plane, based on said focus detection signal; and
exposure operating means for discriminating whether to effect the exposure operation in the state of the image of the object field in the in-focus state or in the state of said image immediately before the exposure operation, according to the focus state detected by said in-focus state detection means immediately before the exposure operation by said exposure means.

15. A camera according to claim 14, further comprising:
light metering means for metering the brightness of the object field; and
memory means for storing the output of said light metering means at an in-focus state;
wherein said in-focus state detection means is adapted to release the in-focus signal when the amount of defocus detected by said focus detection means falls within a first predetermined range; and
said exposure operating means is adapted to execute the exposure operation based on the light metered value stored in said memory means when said defocus amount immediately before the exposure operation by said exposure means is outside a second predetermined range wider than said first predetermined range, but execute the exposure operation based on the light metered value immediately before the exposure operation when said defocus amount falls within said second predetermined range.

16. A camera according to claim 15, wherein said second predetermined range is asymmetrically selected in the forward and backward focus sides around the zero defocus position.

17. A camera according to claim 15, wherein said second predetermined range is rendered variable according to the photographing distance to the object.

18. A camera according to claim 15, wherein said light metering means comprises plural light metering areas and measures the brightness in each of said areas.

19. A camera according to claim 14, wherein said focus detection means comprises plural zones and detects focus state in each of said zones.

* * * * *